United States Patent
Kimura et al.

(10) Patent No.: US 7,709,552 B2
(45) Date of Patent: May 4, 2010

(54) ORGANIC/INORGANIC COMPOSITE

(75) Inventors: Nobuo Kimura, Ichihara (JP);
Hiromoto Shibata, Ichihara (JP);
Kazuki Hasegawa, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 277 days.

(21) Appl. No.: 11/816,565

(22) PCT Filed: Feb. 16, 2006

(86) PCT No.: PCT/JP2006/302710

§ 371 (c)(1),
(2), (4) Date: Aug. 17, 2007

(87) PCT Pub. No.: WO2006/088079

PCT Pub. Date: Aug. 24, 2006

(65) Prior Publication Data

US 2009/0025610 A1    Jan. 29, 2009

(30) Foreign Application Priority Data

Feb. 18, 2005 (JP) ............................. 2005-043199
Aug. 29, 2005 (JP) ............................. 2005-248170
Jan. 23, 2006 (JP) ............................. 2006-013933

(51) Int. Cl.
*C09D 183/04* (2006.01)
*C08G 77/06* (2006.01)

(52) U.S. Cl. ................. 522/83; 522/148; 522/172; 528/14; 528/32

(58) Field of Classification Search .............. 522/84, 522/85, 83, 148, 172; 528/14, 32
See application file for complete search history.

(56) References Cited

U.S. PATENT DOCUMENTS 6,013,372 A   1/2000   Hayakawa et al.
6,228,480 B1  5/2001   Kimura et al.

FOREIGN PATENT DOCUMENTS

JP   9-310039   12/1997

(Continued)

OTHER PUBLICATIONS

Dec. 21, 2009 Decision for Grant of Patent issued in Korean Patent Application No. 10-2009-7001792 with English Translation.

*Primary Examiner*—Susan W Berman
(74) *Attorney, Agent, or Firm*—Oliff & Berridge, PLC

(57) ABSTRACT

An organic/inorganic composite including a condensation product of an organic silicon compound represented by formula (I) as a major component; at least one kind of a photosensitive compound which is sensitive to light having a wavelength of 350 nm or less selected from the group consisting of metal chelate compounds, compounds of metal organic acid salts, metal compounds having 2 or more hydroxyl or hydrolyzable groups, hydrolyzates thereof, and condensation products thereof; and/or a compound derived from the photosensitive compound;

$$R_n SiX_{4-n} \quad (I)$$

wherein R represents an organic group in which carbon directly bonds to Si represented in the formula and X represents a hydroxyl or hydrolyzable group; n represents 1 or 2; R may be the same or different when n is 2; and X may be the same or different when (4-n) is 2 or more.

10 Claims, 6 Drawing Sheets

FOREIGN PATENT DOCUMENTS

| | | |
|---|---|---|
| JP | 10-057817 | 3/1998 |
| JP | 10-195417 | 7/1998 |
| JP | 2000-169755 | 6/2000 |
| JP | 2000-336281 | 12/2000 |
| JP | 2002-363494 | 12/2002 |
| JP | 2003-253157 | 9/2003 |
| KR | 1999-0076677 | 10/1999 |
| WO | 96/29375 | 9/1996 |
| WO | 2005/113142 | 12/2005 |

ORGANIC/INORGANIC COMPOSITE

RELATED APPLICATIONS

This is a U.S. national phase application under 35 U.S.C. §371 of International Patent Application No. PCT/JP2006/302710, filed Feb. 16, 2006, which claims the benefit of Japanese Patent Application Nos. 2005-04319, filed Feb. 18, 2005, 2005-248170, filed Aug. 29, 2005, and 2006-013933, filed Jan. 23, 2006, all of which are incorporated by reference herein. The International Application was published in Japanese on Aug. 24, 2006 as International Publication No. WO/2006/088079 under PCT Article 21(2).

TECHNICAL FIELD

The present invention relates to an organic/inorganic composite, a production method thereof, and a composition for forming organic/inorganic composites, and specifically relates to an organic/inorganic composite in which the carbon content of the surface is made lower than that of the inside by irradiating light having a wavelength of 350 nm or less, a production method thereof, and a composition for forming organic/inorganic composites.

BACKGROUND ART

Currently, trifunctional silanes are mainly used as raw materials for silane-based coating agents which are commercially available and polysiloxanes having moderate hardness and flexibility are formed using such trifunctional silanes. However, hard coatability is still insufficient with the film formed of trifunctional silanes and although colloidal silica or tetrafunctional silanes are mixed with the trifunctional silanes as a supplement, hardening of the films leads to cracking occurring easily and impairment in adhesive properties thereof, which is a problem.

As a silane-based coating agent, for example, a composition for forming antifouling films containing a trifunctional alkoxysilane compound having an epoxy group is known (refer to Patent document 1). Moreover, a silane-based coating agent which contains a photocatalyst is also proposed and films are hardened by using a photoacid generating agent, crosslinking agent, curing catalyst, or the like (for example, refer to Patent documents 2 and 3). Furthermore, a graded material of organic/inorganic composites based on silane having a component-gradient structure in which the content of metal-based compounds in the material changes continuously from the material surface in the depth direction is also proposed (for example, refer to Patent document 4).

[Patent document 1] Japanese Unexamined Patent Application, First Publication No. Hei 10-195417

[Patent document 2] Japanese Laid-Open Patent Application No. 2002-363494

[Patent document 3] Japanese Laid-Open Patent Application No. 2000-169755

[Patent document 4] Japanese Laid-Open Patent Application No. 2000-336281

DISCLOSURE OF THE INVENTION

Problems to be Solved by the Invention

The object of the present invention is to provide a novel organic/inorganic composite which uses a photosensitive compound and particularly an organic/inorganic composite which has a desired hardness in the surface thereof and is also excellent in adhesive properties with substrates, a production method thereof, and a composition for forming an organic/inorganic composite which is capable of forming organic/inorganic composites.

Means for Solving the Problem

The present inventors addressed the development of novel organic/inorganic composites and as a result of intensive study, they discovered the following to complete the present invention. That is, by producing an organic/inorganic composite using a specific organic silicon compound and photosensitive compound, it is possible to produce an organic/inorganic composite which has a higher hardness at its surface than the inside thereof and which has excellent adhesive properties to substrates, and moreover to produce an organic/inorganic composite which has a considerably high hardness at its surface, and at the same time also has excellent adhesive properties to substrates while having an appropriate hardness in the inside and on the back surface side thereof.

In other words, the present invention relates to the following:

(1) An organic/inorganic composite characterized by having a condensation product of an organic silicon compound represented by the formula (I)

$$R_n SiX_{4-n} \qquad (I)$$

(in the formula, R represents an organic group in which carbon directly bonds to Si represented in the formula and X represents a hydroxyl or hydrolyzable group; n represents 1 or 2, R may be the same or different when n is 2, and X may be the same or different when (4-n) is 2 or more) as a major component; and by containing one kind of a photosensitive compound which is sensitive to light having a wavelength of 350 nm or less selected from the group consisting of metal chelate compounds, compounds of metal organic acid salts, metal compounds having 2 or more hydroxyl or hydrolyzable groups, hydrolyzates thereof, and condensation products thereof; and/or a compound derived from the photosensitive compound;

(2) The organic/inorganic composite according to the above (1) characterized in that a metal chelate compound has a hydroxyl or hydrolyzable group;

(3) The organic/inorganic composite according to the above (1) or (2) characterized in that a compound of a metal organic acid salt has a hydroxyl or hydrolyzable group;

(4) The organic/inorganic composite according to any one of the above (1) to (3) characterized in that a hydrolyzate and/or a condensation product of a metal compound, which has 2 or more hydroxyl or hydrolyzable groups, is a hydrolyzed product using 0.5 moles or more of water with respect to 1 mole of the metal compound having 2 or more hydroxyl or hydrolyzable groups;

(5) The organic/inorganic composite according to any one of the above (1) to (4) characterized in that a hydrolyzate and/or a condensation product of a metal chelate compound is a hydrolyzed product using 5 to 100 moles of water with respect to 1 mole of the metal chelate compound;

(6) The organic/inorganic composite according to any one of the above (1) to (5) characterized in that a hydrolyzate and/or a condensation product of a compound of a metal organic acid salt is a hydrolyzed product using 5 to 100 moles of water with respect to 1 mole of the compound of a metal organic acid salt;

(7) The organic/inorganic composite according to any one of the above (1) to (6) characterized in that a metal chelate compound is a β-ketocarbonyl compound, a β-ketoester compound, or an α-hydroxyester compound;

(8) The organic/inorganic composite according to any one of the above (1) to (7) characterized in that a hydrolyzable group is a $C_{1-4}$ alkoxy or a $C_{1-6}$ acyloxy;

(9) The organic/inorganic composite according to any one of the above (1) to (8) characterized in that a metal in the metal compound, metal chelate compound, or the compound of a metal organic acid salt is at least one selected from the group consisting of titanium, zirconium, aluminum, silicon, germanium, indium, tin, tantalum, zinc, tungsten, and lead; and

(10) The organic/inorganic composite according to any one of the above (1) to (9) characterized in that in the formula (I), R is a $C_{1-10}$ alkyl, a $C_{2-10}$ alkenyl, or a $C_{1-10}$ epoxyalkyl.

In addition, the present invention relates to the following:

(11) The organic/inorganic composite according to any one of the above (1) to (10) characterized by being a thin film;

(12) The organic/inorganic composite according to the above (11) characterized by being a thin film in which the carbon content in a film surface section at 10 nm from the film surface in the depth direction is 80% or less of the carbon content in a film back-surface section at 10 nm from the film back-surface in the depth direction;

(13) The organic/inorganic composite according to the above (11) or (12) characterized in that the carbon content gradually increases from the film surface to a predetermined depth;

(14) The organic/inorganic composite according to the above (13) characterized in that the depth to which the carbon content gradually increases is 5 to 80% of the film thickness;

(15) The organic/inorganic composite according to the above (13) or (14) characterized in that the depth to which the carbon content gradually increases is 50 to 2000 nm;

(16) The organic/inorganic composite according to any one of the above (11) to (15) characterized by being a thin film in which a pencil hardness defined in the pencil method of JIS K 5600-5-4 is 5H or more when formed onto a glass substrate;

(17) A polysiloxane-based thin film which is a thin film having a condensation product of an organic silicon compound represented by the formula (I)

$$R_n SiX_{4-n} \qquad (I)$$

(in the formula, R represents an organic group in which carbon directly bonds to Si represented in the formula and X represents a hydroxyl or hydrolyzable group; n represents 1 or 2, R may be the same or different when n is 2, and X may be the same or different when (4-n) is 2 or more) as a major component; and characterized in that the carbon content in a film surface section at 10 nm from the film surface in the depth direction is 80% or less of the carbon content in a film back-surface section at 10 nm from the film back-surface in the depth direction;

(18) The polysiloxane-based thin film according to the above (17) characterized in that the carbon content gradually increases from the film surface to a predetermined depth;

(19) The polysiloxane-based thin film according to the above (18) characterized in that the depth to which the carbon content gradually increases is 5 to 80% of the film thickness; and

(20) The polysiloxane-based thin film according to the above (18) or (19) characterized in that the depth to which the carbon content gradually increases is 50 to 2000 nm.

Moreover, the present invention relates to the following:

(21) The polysiloxane-based thin film according to any one of the above (17) to (20) characterized in that a pencil hardness defined in the pencil method of JIS K 5600-5-4 is 5H or more when formed onto a glass substrate;

(22) The polysiloxane-based thin film according to any one of the above (17) to (21) characterized by further containing a photosensitive compound which is sensitive to light having a wavelength of 350 nm or less and/or a compound derived therefrom;

(23) The polysiloxane-based thin film according to the above (22) characterized by containing one kind of a photosensitive compound which is sensitive to light having a wavelength of 350 nm or less selected from the group consisting of metal chelate compounds, compounds of metal organic acid salts, metal compounds having 2 or more hydroxyl or hydrolyzable groups, hydrolyzates thereof, and condensation products thereof; and/or a compound derived from the photosensitive compound;

(24) The polysiloxane-based thin film according to the above (23) characterized in that the metal chelate compound has a hydroxyl or hydrolyzable group;

(25) The polysiloxane-based thin film according to the above (23) or (24) characterized in that a compound of a metal organic acid salt has a hydroxyl or hydrolyzable group;

(26) The polysiloxane-based thin film according to any one of the above (23) to (25) characterized in that a hydrolyzate and/or a condensation product of a metal compound, which has 2 or more hydroxyl or hydrolyzable groups, is a hydrolyzed product using 0.5 moles or more of water with respect to 1 mole of the metal compound having 2 or more hydroxyl or hydrolyzable groups;

(27) The polysiloxane-based thin film according to any one of the above (23) to (26) characterized in that the hydrolyzate and/or a condensation product of a metal chelate compound is a hydrolyzed product using 5 to 100 moles of water with respect to 1 mole of the metal chelate compound;

(28) The polysiloxane-based thin film according to any one of the above (23) to (27) characterized in that a hydrolyzate and/or a condensation product of a compound of a metal organic acid salt is a hydrolyzed product using 5 to 100 moles of water with respect to 1 mole of the compound of a metal organic acid salt;

(29) The polysiloxane-based thin film according to any one of the above (23) to (28) characterized in that a metal chelate compound is a β-ketocarbonyl compound, a β-ketoester compound, or an α-hydroxyester compound;

(30) The polysiloxane-based thin film according to any one of the above (23) to (29) characterized in that a hydrolyzable group is a $C_{1-4}$ alkoxy or a $C_{1-6}$ acyloxy; and

(31) The polysiloxane-based thin film according to any one of the above (23) to (30) characterized in that a metal in the metal compound, metal chelate compound, or the compound of a metal organic acid salt is at least one selected from the group consisting of titanium, zirconium, aluminum, silicon, germanium, indium, tin, tantalum, zinc, tungsten, and lead.

Furthermore, the present invention relates to the following:

(32) The polysiloxane-based thin film according to any one of the above (17) to (31) characterized in that in the formula (I), R is a $C_{1-10}$ alkyl, a $C_{2-10}$ alkenyl, or a $C_{1-10}$ epoxyalkyl;

(33) A production method of an organic/inorganic composite characterized by irradiating light having a wavelength of 350 nm or less onto an organic silicon compound represented by the following formula (I) and/or a condensation product thereof under the presence of at least one kind of a photosensitive compound selected from the group consisting of metal chelate compounds, compounds of metal organic acid salts, metal compounds having 2 or more hydroxyl or hydrolyzable groups, hydrolyzates thereof, and condensation products thereof;

$$R_n SiX_{4-n} \tag{I}$$

(in the formula, R represents an organic group in which a carbon directly bonds to Si represented in the formula and X represents a hydroxyl or hydrolyzable group; n represents 1 or 2, R may be the same or different when n is 2, and X may be the same or different when (4-n) is 2 or more);

(34) The production method of an organic/inorganic composite according to the above (33) characterized in that a metal chelate compound has a hydroxyl or hydrolyzable group;

(35) The production method of an organic/inorganic composite according to the above (33) or (34) characterized in that a compound of a metal organic acid salt has a hydroxyl or hydrolyzable group;

(36) The production method of an organic/inorganic composite according to any one of the above (33) to (35) characterized in that a hydrolyzate and/or a condensation product of a metal compound, which has 2 or more hydroxyl or hydrolyzable groups, is a hydrolyzed product using 0.5 moles or more of water with respect to 1 mole of the metal compound having 2 or more hydroxyl or hydrolyzable groups;

(37) The production method of an organic/inorganic composite according to any one of the above (33) to (36) characterized in that a hydrolyzate and/or a condensation product of a metal chelate compound is a hydrolyzed product using 5 to 100 moles of water with respect to 1 mole of the metal chelate compound;

(38) The production method of an organic/inorganic composite according to any one of the above (33) to (37) characterized in that a hydrolyzate and/or a condensation product of a compound of a metal organic acid salt is a hydrolyzed product using 5 to 100 moles of water with respect to 1 mole of the compound of a metal organic acid salt;

(39) The production method of an organic/inorganic composite according to any one of the above (33) to (38) characterized in that a metal chelate compound is a β-ketocarbonyl compound, a β-ketoester compound, or an α-hydroxyester compound;

(40) The production method of an organic/inorganic composite according to any one of the above (33) to (39) characterized in that a hydrolyzable group is a $C_{1-4}$ alkoxy or a $C_{1-6}$ acyloxy; and

(41) The production method of an organic/inorganic composite according to any one of the above (33) to (40) characterized in that a metal in the metal compound, metal chelate compound, or the compound of a metal organic acid salt is at least one selected from the group consisting of titanium, zirconium, aluminum, silicon, germanium, indium, tin, tantalum, zinc, tungsten, and lead.

In addition, the present invention relates to the following:

(42) The production method of an organic/inorganic composite according to any one of the above (33) to (41) characterized in that in the formula (I), R is a $C_{1-10}$ alkyl, a $C_{2-10}$ alkenyl, or a $C_{1-10}$ epoxyalkyl;

(43) The production method of an organic/inorganic composite according to any one of the above (33) to (42) characterized in that the average particle diameter of the condensation product of an organic silicon compound is 10 nm or less;

(44) The production method of an organic/inorganic composite according to any one of the above (33) to (43) characterized in that the average particle diameter of the photosensitive compound is 10 nm or less;

(45) The production method of an organic/inorganic composite according to any one of the above (33) to (44) characterized in that light being irradiated is light mainly composed of light having a wavelength within a range of 150 to 350 nm;

(46) The production method of an organic/inorganic composite according to the above (45) characterized in that light being irradiated is light mainly composed of light having a wavelength within a range of 250 to 310 nm;

(47) The production method of an organic/inorganic composite according to any one of the above (33) to (46) characterized by producing a thin film;

(48) The production method of an organic/inorganic composite according to the above (47) characterized in that in the produced thin film, the carbon content in a film surface section at 10 nm from the film surface in the depth direction is 80% or less of the carbon content in a film back-surface section at 10 nm from the film back-surface in the depth direction;

(49) The production method of an organic/inorganic composite according to the above (48) characterized in that the carbon content in the produced thin film gradually increases from the film surface to a predetermined depth;

(50) The production method of an organic/inorganic composite according to the above (49) characterized in that the depth to which the carbon content gradually increases is 5 to 80% of the film thickness; and

(51) The production method of an organic/inorganic composite according to the above (49) or (50) characterized in that the depth to which the carbon content gradually increases is 50 to 2000 nm.

Moreover, the present invention relates to the following:

(52) The production method of an organic/inorganic composite according to any one of the above (47) to (51) characterized in that a pencil hardness defined in the pencil method of JIS K 5600-5-4 of the produced thin film is 5H or more when formed onto a glass substrate;

(53) An organic/inorganic composite characterized by being produced by any one of the production methods of the above (33) to (52);

(54) A composition for forming an organic/inorganic composite characterized by containing an organic silicon compound represented by the following formula (I) and/or a condensation product thereof; and at least one kind of a photosensitive compound selected from the group consisting of metal chelate compounds, compounds of metal organic acid salts, metal compounds having 2 or more hydroxyl or hydrolyzable groups, hydrolyzates thereof, and condensation products thereof;

$$R_nSiX_{4-n} \quad (I)$$

(in the formula, R represents an organic group in which a carbon directly bonds to Si represented in the formula and X represents a hydroxyl or hydrolyzable group; n represents 1 or 2, R may be the same or different when n is 2, and X may be the same or different when (4-n) is 2 or more);

(55) The composition for forming an organic/inorganic composite according to the above (54) characterized by further containing water and a solvent;

(56) The composition for forming an organic/inorganic composite according to the above (54) or (55) characterized in that a metal chelate compound has a hydroxyl or hydrolyzable group;

(57) The composition for forming an organic/inorganic composite according to any one of the above (54) to (56) characterized in that a compound of a metal organic acid salt has a hydroxyl or hydrolyzable group;

(58) The composition for forming an organic/inorganic composite according to any one of the above (54) to (57) characterized in that a hydrolyzate and/or a condensation product of a metal compound, which has 2 or more hydroxyl or hydrolyzable groups, is a hydrolyzed product using 0.5 moles or more of water with respect to 1 mole of the metal compound having 2 or more hydroxyl or hydrolyzable groups;

(59) The composition for forming an organic/inorganic composite according to any one of the above (54) to (58) characterized in that a hydrolyzate and/or a condensation product of a metal chelate compound is a hydrolyzed product using 5 to 100 moles of water with respect to 1 mole of the metal chelate compound;

(60) The composition for forming an organic/inorganic composite according to any one of the above (54) to (59) characterized in that a hydrolyzate and/or a condensation product of a compound of a metal organic acid salt is a hydrolyzed product using 5 to 100 moles of water with respect to 1 mole of the compound of a metal organic acid salt; and

(61) The composition for forming an organic/inorganic composite according to any one of the above (54) to (60) characterized in that a metal chelate compound is a β-ketocarbonyl compound, a β-ketoester compound, or an α-hydroxyester compound.

Furthermore, the present invention relates to the following:

(62) The composition for forming an organic/inorganic composite according to any one of the above (54) to (61) characterized in that a hydrolyzable group is a $C_{1-4}$ alkoxy or a $C_{1-6}$ acyloxy;

(63) The composition for forming an organic/inorganic composite according to any one of the above (54) to (62) characterized in that a metal in the metal compound, metal chelate compound, or the compound of a metal organic acid salt is at least one selected from the group consisting of titanium, zirconium, aluminum, silicon, germanium, indium, tin, tantalum, zinc, tungsten, and lead;

(64) The composition for forming an organic/inorganic composite according to any one of the above (54) to (63) characterized in that in the formula (I), R is a $C_{1-10}$ alkyl, a $C_{2-10}$ alkenyl, or a $C_{1-10}$ epoxyalkyl;

(65) The composition for forming an organic/inorganic composite according to any one of the above (54) to (64) characterized in that the average particle diameter of the condensation product of an organic silicon compound is 10 nm or less;

(66) The composition for forming an organic/inorganic composite according to any one of the above (54) to (65) characterized in that the average particle diameter of the photosensitive compound is 10 nm or less;

(67) The composition for forming an organic/inorganic composite according to any one of the above (54) to (66) characterized in that 0.01 to 0.5 mole equivalents of metal atoms in the photosensitive compounds are contained with respect to the silicon atoms in the organic silicon compound represented by the formula (I) and/or a condensation product thereof;

(68) The composition for forming an organic/inorganic composite according to any one of the above (54) to (67) characterized by being capable of forming a thin film in which the carbon content in a film surface section at 10 nm from the film surface in the depth direction is 80% or less of the carbon content in a film back-surface section at 10 nm from the film back-surface in the depth direction;

(69) The composition for forming an organic/inorganic composite according to any one of the above (54) to (68) characterized by being capable of forming a thin film in which the carbon content gradually increases from the film surface to a predetermined depth;

(70) The composition for forming an organic/inorganic composite according to the above (69) characterized in that the depth to which the carbon content gradually increases is 5 to 80% of the film thickness;

(71) The composition for forming an organic/inorganic composite according to the above (69) or (70) characterized in that the depth to which the carbon content gradually increases is 50 to 2000 nm; and

(72) The composition for forming an organic/inorganic composite according to any one of the above (54) to (71) characterized by being capable of forming a thin film in which pencil hardness defined in the pencil method of JIS K 5600-5-4 is 5H or more when formed onto a glass substrate.

EFFECTS OF THE INVENTION

According to the present invention, it is possible to provide an organic/inorganic composite which has a considerably high hardness at its surface, and at the same time also has an excellent adhesive property to substrates while having an appropriate hardness in the inside and back surface side thereof.

BEST MODES FOR CARRYING OUT THE INVENTION

Figure 1:
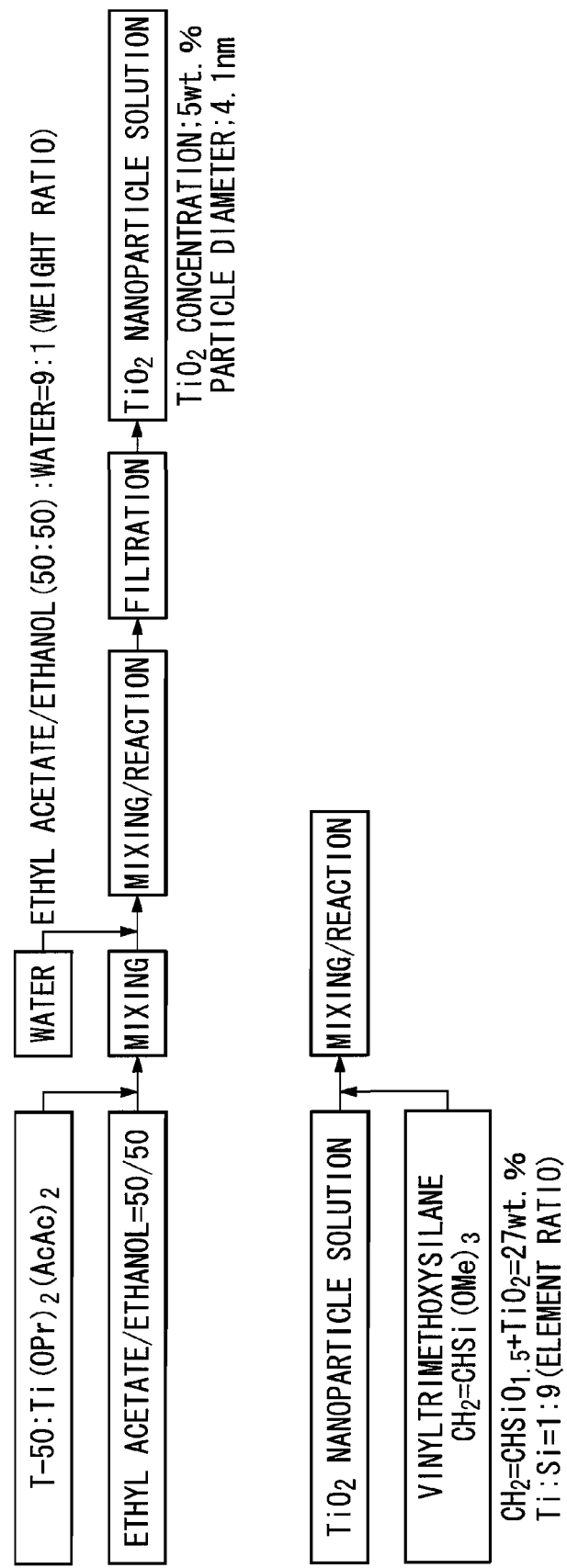
FIG. 1 is a diagram showing the production process of a composition according to Example 1 of the present invention for forming organic/inorganic composites.

The organic/inorganic composite of the present invention is not particularly limited as long as it is an organic/inorganic composite which has a condensation product of an organic silicon compound represented by the formula (I) (hereinafter may simply be referred to as the organic silicon compound) as a major component and which contains at least one kind of a photosensitive compound which is sensitive to light having a wavelength of 350 nm or less selected from the group consisting of metal chelate compounds, compounds of metal organic acid salts, metal compounds having 2 or more hydroxyl or hydrolyzable groups, hydrolyzates thereof, and condensation products thereof; and/or a compound derived from the photosensitive compound. Examples thereof include one in which a condensation product of an organic silicon compound and a phososensitive compound and/or a derivative thereof are dispersed in an unbound state; one in which a condensation product of an organic silicon compound and a phososensitive compound and/or a derivative thereof are bound (for example, one which has a Si—O—M bond where M represents a metal atom in a photosensitive compound); and one which is in a mixed state of the former two; and they can be produced using a composition for forming organic/inorganic composites which will be described later.

A photosensitive compound refers to a compound in which a carbon component in the surface side can be removed due to the effect of light which is irradiated from the surface side and has a wavelength of 350 nm or less regardless of the removal mechanism. The photosensitive compound is preferably a compound in which a carbon content in the surface section at 10 nm from the surface in the depth direction can be made 80% or less of the part where an amount of carbon is not reduced (in the case of a film, for example, a back-surface section at 10 nm from the film back-surface in the depth direction), more preferably 2 to 60%, and even more preferably 2 to 40%. A particularly preferable photosensitive compound is a compound in which a carbon component can be removed down to a predetermined depth so that a removed amount thereof gradually decreases from the surface side, in other words, a compound capable of forming a film in which the carbon content gradually increases from the surface to a predetermined depth. Specific examples thereof include a compound which is excited by absorbing light having a wavelength of 350 nm or less. In addition, light having a wavelength of 350 nm or less refers to light formed by using a light source having any light with a wavelength of 350 nm or less as a component, and preferably light formed by using a light source having any light with a wavelength of 350 nm or less as a major component; in other words, light formed by using a light source having light with a wavelength of 350 nm or less as the most abundant component. Note that the condensation product of an organic silicon compound, which will be a major component in the organic/inorganic composites of the present invention, refers to one in which an organic silicon compound and/or a condensation product thereof in the production method of organic/inorganic composites and a composition for forming organic/inorganic composites of the present invention, which will be described later, is further condensed.

In the formula (I), R represents an organic group in which a carbon atom directly bonds to Si in the formula. Examples of such organic groups include a hydrocarbon and groups formed from polymers, and $C_{1-30}$ hydrocarbon is preferable and $C_{10}$ alkyl, $C_{2-10}$ alkenyl, or $C_{1-10}$ epoxyalkyl is more preferable. Moreover, such organic groups may contain a silicon atom and they may be groups containing polymers such as polysiloxane, polyvinylsilane, and polyacrylsilane. Examples of a substituent include halogen and methacryloxy. Additionally, n represents 1 or 2 and those where n=1 are particularly preferable. R may be the same or different when n is 2.

X represents a hydroxyl or hydrolyzable group. X may be the same or different when (4-n) in the formula (I) is 2 or more. A hydrolyzable group refers to, for example, a group capable of forming a silanol group due to hydrolysis or a group capable of forming a siloxane condensate, by being heated at 25 to 100° C. without a catalyst and under the coexistence of excess water. Specific examples thereof include alkoky, acyloxy, halogen, and isocyanate, and $C_{1-4}$ alkoxy or $C_{1-4}$ acyloxy is preferable.

Specific examples of organic silicon compounds include methyltrichlorosilane, methyltrimethoxysilane, methyltriethoxysilane, methyltributoxysilane, ethyltrimethoxysilane, ethyltriisopropoxysilane, ethyltributoxysilane, butyltrimethoxysilane, pentafluorophenyltrimethoxysilane, phenyltrimethoxysilane, nonafluorobutylethyltrimethoxysilane, trifluoromethyltrimethoxysilane, dimethyldiaminosilane, dimethyldichlorosilane, dimethyldiacetoxysilane, dimethyldimethoxysilane, diphenyldimethoxysilane, dibutyldimethoxysilane, trimethylchlorosilane, vinyltrimethoxysilane, (meth)acryloxypropyltrimethoxysilane, glycidyloxytrimethoxysilane, 3-(3-methyl-3-oxetanemethoxy)propyltrimethoxysilane, oxacyclohexyltrimethoxysilane, methyltri(meth)acryloxysilane, methyl[2-(meth)acryloxyethoxy]silane, methyl-triglycidyloxysilane, and methyltris(3-methyl-3-oxetanemethoxy)silane. They can be used alone or in combination of two or more kinds thereof.

In addition, examples of polymer-based organic silicon compounds include (meth)acrylic esters such as methyl (meth)acrylate, ethyl(meth)acrylate, butyl(meth)acrylate, 2-ethylhexyl(meth)acrylate, and cyclohexyl(meth)acrylate; carboxylic acids such as (meth)acrylic acid, itaconic acid, and fumaric acid, and acid anhydrides such as maleic anhydride; epoxy compounds such as glycidyl(meth)acrylate; amino compounds such as diethylaminoethyl(meth)acrylate and aminoethylvinylether; amide compounds such as (meth)acrylamide, itaconic acid diamide, α-ethylacrylamide, croton amide, fumaric acid diamide, maleic acid diamide, and N-butoxymethyl(meth)acrylamide; and those having a vinyl polymer, in which vinyl compounds selected from acrylonitrile, styrene, α-methylstyrene, vinyl chloride, vinyl acetate, vinyl propionate, or the like are copolymerized, as an R component in the formula (I).

The photosensitive compound in the organic/inorganic composite of the present invention is a compound which is sensitive to light having a wavelength of 350 nm or less, and at least one kind of a compound selected from the group consisting of metal chelate compounds, compounds of metal organic acid salts, metal compounds having 2 or more hydroxyl or hydrolyzable groups, hydrolyzates thereof, and condensation products thereof. The compound is preferably a hydrolyzate and/or a condensation product and particularly preferably a hydrolyzate and/or a condensation product of a metal chelate compound. Examples of the compound derived therefrom include those in which a condensation product of a metal chelate compound or the like is further condensed. Such photosensitive compounds and/or derivatives thereof may be, as described above, chemically bound to an organic silicon compound, dispersed in an unbound state, or in a mixed state of the former two.

Metal chelate compounds are preferably the metal chelate compounds having a hydroxyl or a hydrolyzable group and more preferably the metal chelate compounds having 2 or more hydroxyl or hydrolyzable groups. Note that the phrase "having 2 or more hydroxyl or hydrolyzable groups" means that the sum of hydrolyzable groups and hydroxyl groups is 2 or more. In addition, as the aforementioned metal chelate compounds, β-ketocarbonyl compounds, β-ketoester compounds, and α-hydroxyester compounds are preferable. Specific examples thereof include the compounds in which β-ketoesters such as methyl acetoacetate, n-propyl acetoacetate, isopropyl acetoacetate, n-butyl acetoacetate, sec-butyl acetoacetate, and t-butyl acetoacetate; β-diketones such as acetylacetone, hexane-2,4-dione, heptane-2,4-dione, heptane-3,5-dione, octane-2,4-dione, nonane-2,4-dione, and 5-methyl-hexane-2,4-dione; hydroxycarboxylic acids such as glycolic acid and lactic acid; or the like are coordinated.

Compounds of metal organic acid salts are compounds formed from salts which are obtained from a metal ion and an organic acid. Examples of organic acids include organic compounds which exhibit acidity like carboxylic acids such as acetic acid, oxalic acid, tartaric acid, and benzoic acid; sulfur-containing organic acids such as sulfonic acid, sulfinic acid, and thiophenol; phenolic compounds; enol compounds; oxime compounds; imide compounds; and aromatic sulfonamides.

In addition, the metal compounds having 2 or more hydroxyl or hydrolyzable groups exclude the abovementioned metal chelate compounds and compounds of metal organic acid salts and examples thereof include metal hydroxides and metal alcoholates.

Examples of the hydrolyzable group in metal compounds, metal chelate compounds, or compounds of metal organic acid salts include alkoxy, acyloxy, halogen, and isocyanate, and $C_{1-4}$ alkoxy and $C_{1-4}$ acyloxy are preferable. Note that the phrase "having 2 or more hydroxyl or hydrolyzable groups" means that the sum of hydrolyzable groups and hydroxyl groups is 2 or more.

As such hydrolyzates and/or condensation products of metal compounds, those which are hydrolyzed using 0.5 moles or more of water with respect to 1 mole of a metal compound having 2 or more hydroxyl or hydrolyzable groups are preferable and those which are hydrolyzed using 0.5 to 2 moles of water are more preferable.

In addition, as such hydrolyzates and/or condensation products of metal chelate compounds, those which are hydrolyzed using 5 to 100 moles of water with respect to 1 mole of a metal chelate compound are preferable and those which are hydrolyzed using 5 to 20 moles of water are more preferable.

Moreover, as such hydrolyzates and/or condensation products of compounds of metal organic acid salts, those which are hydrolyzed using 5 to 100 moles of water with respect to 1 mole of a compound of a metal organic acid salt are preferable and those which are hydrolyzed using 5 to 20 moles of water are more preferable.

Additionally, examples of the metal in these metal compounds, metal chelate compounds, or compounds of metal organic acid salts include titanium, zirconium, aluminum, silicon, germanium, indium, tin, tantalum, zinc, tungsten, and lead, and titanium, zirconium, and aluminum are preferable among them and titanium is particularly preferable. Two or more kinds thereof can also be used.

Specific examples of the abovementioned organic/inorganic composite of the present invention include a compact which is formed by being casted in a mold and a thin film which is formed by being coated on a substrate. When a thin film is formed, although the method is not particularly limited as long as it is a method to dry after coating on a substrate, it is preferable to irradiate light having a wavelength of 350 nm or less thereon after drying, and it is possible, thereby, to obtain a thin film with higher hardness (polysiloxane-based thin film). The pencil hardness defined in the pencil method of JIS K 5600-5-4 is preferably about 1H to 4H in a thin film after being dried (corresponds to one which constitutes the inside of a film in the light-irradiated thin film) when formed on a glass substrate and the pencil hardness of 2H to 4H is preferable from the viewpoints of adhesive properties with substrates and hardness. Additionally, the pencil hardness defined in the pencil method of JIS K 5600-5-4 is preferably 5H or more in a thin film after being irradiated with light when formed on a glass substrate and the pencil hardness of 7H is more preferable.

Such a thin film can be used, for example, as a hard coat film, gas barrier film, antistatic film, UV screening film, anti-reflection film, or the like. Application examples as a hard coat film include glass for an automobile, headlight, exterior parts, interior parts, electrical components and sunroof; front cases of cellular phones, rear cases, and battery cases; spectacle lens; optical disks; building decorative sheets and films; TV front panels; CRT covers; and video reflectors.

Examples of substrates on which the thin film of the present invention can be formed include metals, ceramics, glass, and plastics. Although the formation of thin films on a plastic substrate has conventionally been difficult, and thus substrates were limited to inorganic substrates such as glass, the thin film of the present invention can readily be film-formed even on plastic substrates where the film formation is difficult and is also suited to be formed on the optical components made of plastics. Such plastics include polycarbonate resins, acrylic resins, polyimide resins, polyester resins, epoxy resins, liquid crystal polymer resins, and polyethersulfones.

Additionally, known coating methods can be used as methods for coating a composition for forming organic/inorganic composites and examples thereof include a dipping method, spraying method, bar coating method, roll coating method, spin coating method, curtain coating method, gravure printing method, silk screening method, and inkjet method. Moreover, the thickness of the film to be formed is not particularly limited and is, for example, about 0.05 to 200 μm.

The drying treatment of a film, which is formed by coating the composition for forming organic/inorganic composites, is preferably carried out at, for example, a temperature of 40 to 200° C. for about 1 to 120 minutes and more preferably carried out at a temperature of 60 to 120° C. for about 10 to 60 minutes.

In addition, the irradiation of light having a wavelength of 350 nm or less can be carried out by using a known device such as a high pressure mercury lamp, low pressure mercury lamp, metal halide lamp, and excimer lamp. The light to be irradiated is preferably light having, as a main component, light with any wavelength in the range between 150 and 350 nm and more preferably light having, as a main component, light with any wavelength in the range between 250 and 310 nm. As long as one is sensitive to light having such a range of wavelength and is not sensitive to light having a wavelength exceeding 350 nm (preferably more than 310 nm), it is hardly affected by sunlight. Moreover, examples of the amount of light irradiation include about 1 to 100 J/cm$^2$ and the amount is preferably about 3 to 20 J/cm$^2$ and more preferably 3 to 10 J/cm$^2$ when taking the hardening efficiency of films (relationship between irradiation energy and degree of film hardening) into account. Note that the "irradiation of light having a wavelength of 350 nm or less" refers to the irradiation using a light source having any light with a wavelength of 350 nm or less as a component and preferably the irradiation using a light source having any light with a wavelength of 350 nm or less as the main component, in other words, the irradiation using a light source having light with a wavelength of 350 nm or less as the most abundant component.

Additionally, the polysiloxane-based thin film of the present invention preferably has a configuration in which the carbon content in a film surface section is lower than the carbon content in a film back-surface section and the configuration in which the carbon content in a film surface section at 10 nm from the film surface in the depth direction is 80% or less of the carbon content in a film back-surface section at 10 nm from the film back-surface in the depth direction is more preferable and 2 to 60% is even more preferable. The phrase "the carbon content in a film surface section is lower than the carbon content in a film back-surface section" means that the total amount of carbon from the film surface to the central parts of the film is lower than the total amount of carbon from the film back surface to the central parts of the film. Although the application of such a high-hardness thin film of the present invention is not particularly limited, it is highly useful as a hard coat film since the surface hardness thereof is high.

In addition, the polysiloxane-based thin film of the present invention preferably has a configuration where the carbon content from the film surface to a predetermined depth gradually increases and such a depth in which the carbon content is gradually increasing is preferably 5 to 80% of the film thickness and 10 to 50% is more preferable. Specifically, in the case where the film thickness is about 1 to 2.5 μm, for example, the depth in which the carbon content is gradually increasing is about 50 to 2000 nm.

Examples of the production methods of the organic/inorganic composite and polysiloxane-based thin film of the present invention as described above include a production method of an organic/inorganic composite of the present invention in which light having a wavelength of 350 nm or less is irradiated onto an organic silicon compound represented by the formula (I) and/or a condensation product thereof under the presence of at least one kind of a photosensitive compound selected from the group consisting of metal chelate compounds, compounds of metal organic acid salts, metal compounds having 2 or more hydroxyl or hydrolyzable groups, hydrolyzates thereof, and condensation products thereof; and the compositions of the present invention for forming organic/inorganic composites which will be described later can be used.

Examples of the organic silicon compound represented by the formula (I) used in the production method of the present invention include those described above. The organic silicon compound is preferably a condensation product and the average particle diameter thereof is preferably 10 nm or less and more preferably 4 nm or less. Additionally, examples of the photosensitive compound used in the production method of the present invention include those described above. The photosensitive compound is preferably a hydrolyzate and/or a condensation product and particularly preferably a hydrolyzate and/or a condensation product of a metal chelate compound. The average particle diameter thereof is preferably 10 nm or less and more preferably 7 nm or less. Transparency of organic/inorganic composites (thin films) can thereby be improved. Average particle diameters thereof can be measured by using, for example, HPPS manufactured by Malvern Instruments Ltd.

The composition of the present invention for forming organic/inorganic composites is not particularly limited as long as it is a composition which contains an organic silicon compound represented by the formula (I) and/or a condensation product thereof; and at least one kind of a photosensitive compound selected from the group consisting of metal chelate compounds, compounds of metal organic acid salts, metal compounds having 2 or more hydroxyl or hydrolyzable groups, hydrolyzates thereof, and condensation products thereof; and the composition preferably further contains water and a solvent. Examples of the organic silicon compound represented by the formula (I) and photosensitive compound include those described above.

The solvent to be used is not particularly limited and examples thereof include aromatic hydrocarbons such as benzene, toluene, and xylene; aliphatic hydrocarbons such as hexane and octane; alicyclic hydrocarbons such as cyclohexane and cyclopentane; ketones such as acetone, methyl ethyl ketone, and cyclohexanone; ethers such as tetrahydrofuran and dioxane; esters such as ethyl acetate and butyl acetate; amides such as N,N-dimethylformamide and N,N-dimethylacetamide; sulfoxides such as dimethylsulfoxide; alcohols such as methanol and ethanol; and derivatives of polyhydric alcohols such as ethyleneglycol monoethyl ether and ethyleneglycol monomethyl ether acetate. These solvents can be used alone or in combination of two or more kinds thereof.

The amount of solid content (organic silicon component and photosensitive compound component) in the composition of the present invention for forming organic/inorganic composites is preferably 1 to 75 weight % and more preferably 10 to 60 weight %. In addition, the content of photosensitive compound is, although depending on the kinds thereof, generally such that the metal atoms in the photosensitive compound are 0.01 to 0.5 mole equivalents with respect to the silicon atoms in the organic silicon compound and preferably 0.05 to 0.2 mole equivalents.

Additionally, tetrafunctional silanes or colloidal silica can also be added to the composition of the present invention for organic/inorganic composites for the sake of improving the hardness of the obtained coating film. Examples of the tetrafunctional silanes include tetraaminosilane, tetrachlorosilane, tetraacetoxysilane, tetramethoxysilane, tetraethoxysilane, tetrabutoxysilane, tetrabenzyloxysilane, tetraphenoxysilane, tetra(meth)acryloxysilane, tetrakis[2-(meth)acryloxyethoxy]silane, tetrakis(2-vinyloxyethoxy)silane, tetraglycidyloxysilane, tetrakis(2-vinyloxybutoxy)silane, and tetrakis(3-methyl-3-oxetanemethoxy)silane. Moreover, examples of colloidal silica include water-dispersed colloidal silica, and organic solvent (methanol, isopropyl alcohol, or the like)-dispersed colloidal silica.

In addition, it is also possible to add/disperse a caulk separately in the composition of the present invention for organic/inorganic composites for the sake of developing various characteristics of the obtained coating film such as coloring, film thickening, prevention of ultraviolet penetration to a ground, impartation of corrosion resistance, and heat resistance. Examples of this caulk include non-water-soluble pigments such as organic pigments and inorganic pigments; or particulate-, fibrous-, or scaly-metals and alloys other than pigments;

as well as their oxides, hydroxides, carbides, nitrides, and sulfides. Specific examples of this caulk include particulate, fibrous, or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chrome green, cobalt green, viridian, guinea green, cobalt chrome green, Scheele's green, green earth, manganese green, pigment green, ultramarine, prussian blue, blue verditer, cobalt blue, cerulean blue, copper borate, molybdenum blue, copper sulfide, cobalt violet, mars violet, manganese violet, pigment violet, lead suboxide, calcium plumbate, zinc yellow, lead sulfide, chrome yellow, yellow ocher, cadmium yellow, strontium yellow, titanium yellow, litharge, pigment yellow, cuprous oxide, cadmium red, selenium red, chrome vermilion, red oxide, zinc white, antimony white, basic lead sulfate, titanium white, lithopone, lead silicate, zircon oxide, tungsten white, lead white, zinc flower, Bantison white, lead phthalate, manganese white, lead sulfate, graphite, bone black, diamond black, thermatomic black, vegetable black, potassium titanate whisker, and molybdenum disulfide.

Note that other additives such as known dehydrating agents including methyl orthoformate, methyl orthoacetate, and tetraethoxysilane; various surfactants; silane coupling agents except those described earlier; titanium coupling agents; dyes; dispersing agents; thickening agents; and leveling agents can also be added to the composition of the present invention for organic/inorganic composites.

Examples of the preparation methods of the composition of the present invention for organic/inorganic composites include a method in which water and a solvent are added where necessary and to mix an organic silicon compound and photosensitive compound. Specific examples thereof include a method in which a photosensitive compound is mixed in a solvent and a predetermined amount of water is added thereto to (partially) hydrolyze and subsequently adding an organic silicon compound thereto to (partially) hydrolyze; a method in which an organic silicon compound and photosensitive compound are mixed and thereafter water is added thereto for (partial) hydrolysis; and a method in which an organic silicon compound and photosensitive compound that are separately (partially) hydrolyzed are mixed. Although it is not always necessary to add water or a solvent, it is preferable to prepare a (partial) hydrolyzate by adding water. Although the amount of water which is predetermined depends on the kinds of photosensitive compounds, in the case where the photosensitive compound is a metal compound having 2 or more hydroxyl or hydrolyzable groups, for example, it is preferable to use water of 0.5 moles or more with respect to 1 mole of the metal compound and the use of 0.5 to 2 moles of water is more preferable. Additionally, when the photosensitive compound is a metal chelate compound or a compound of a metal organic acid salt, it is preferable to use 5 to 100 moles of water with respect to 1 mole of the metal chelate compound or the compound of a metal organic acid salt and the use of 5 to 20 moles of water is more preferable.

Although the present invention will be described more specifically below using Examples, the technical scope of the present invention is not limited to these Examples.

Example 1

A composition according to Example 1 for forming organic/inorganic composites was produced as shown in FIG. 1.

1. Synthesis of Photosensitive Compound

After 30.3 g of titanium diisopropoxybisacetylacetonate (T-50 manufactured by Nippon Soda Co., Ltd. in which the amount of solid content based on titanium oxide was 16.5 weight %) was dissolved in 58.4 g of a mixed solvent of ethanol/ethyl acetate (=50/50), 11.3 g of ion-exchanged water (10 times as much as $TiO_2$ in terms of moles) was slowly added dropwise thereto to hydrolyze. One day later, the resulting solution was filtered to obtain $TiO_2$ nanoparticle solution which was yellow, transparent, and had $TiO_2$ concentration of 5 wt. % (A-1). The average particle diameter of the nanoparticles was 4.1 nm and they were monodispersed.

2. Organic Silicon Compound

Vinyltrimethoxysilane (KBM-1003 manufactured by Shin-Etsu Chemical Co., Ltd.) (B-1) was used as an organic silicon compound.

3. Preparation of Composition (Coating Liquid) for Forming Organic/Inorganic Composites The abovementioned (A-1) solution and (B-1) were mixed so that the element ratio (Ti:Si) will be (1:9) to form a coating liquid (C-1 solution). The amount of solid content ($CH_2=CHSiO_{1.5}+TiO_2$) was 27 wt. %. The average particle diameter of the particles in the solution showed a bimodal distribution in which the peaks were at 1.0 nm and 4.0 nm. It was assumed that 4.0 nm corresponds to $TiO_2$ nanoparticles whereas 1.0 nm corresponds to the particles of a hydrolyzed condensation product of vinyltrimethoxysilane. The preservation stability of this solution was highly favorable and the solution could be used even after 2 months without gelation.

Example 2

1. Synthesis of Photosensitive Compound

The $TiO_2$ nanoparticle solution which was yellow and transparent and had $TiO_2$ concentration of 5 wt. % (A-1) was obtained as in Example 1.

2. Organic Silicon Compound

Methyltrimethoxysilane (KBM-13 manufactured by Shin-Etsu Chemical Co., Ltd.) (B-2) was used as an organic silicon compound.

3. Preparation of Composition (Coating Liquid) for Forming Organic/Inorganic Composites The abovementioned (A-1) solution and (B-2) were mixed so that the element ratio (Ti:Si) will be (1:9) to form a coating liquid (C-2 solution). The amount of solid content ($CH_3SiO_{1.5}+TiO_2$) was 24.2 wt. %. The average particle diameter of the particles in the solution showed a bimodal distribution in which the peaks were at 1.2 nm and 4.5 nm. It was assumed that 4.5 nm corresponds to $TiO_2$ nanoparticles whereas 1.2 nm corresponds to the particles of a hydrolyzed condensation product of methyltrimethoxysilane. The preservation stability of this solution was highly favorable and the solution could be used even after 2 months without gelation.

Example 3

1. Synthesis of Photosensitive Compound

The $TiO_2$ nanoparticle solution which was yellow and transparent and had $TiO_2$ concentration of 5 wt. % (A-1) was obtained as in Example 1.

2. Organic Silicon Compound

Vinyltrimethoxysilane (KBM-1003 manufactured by Shin-Etsu Chemical Co., Ltd.) (B-1) and 3-glycidoxypropyltrimethoxysilane (KBM-403 manufactured by Shin-Etsu Chemical Co., Ltd.) (B-3) were used as organic silicon compounds.

3. Preparation of Composition (Coating Liquid) for Forming Organic/Inorganic Composites A solution, which was obtained by adding 164.95 g of the $TiO_2$ nanoparticle solution of 5 wt. % (A-1) and 130.0 g of vinyltrimethoxysilane (B-1) and stirring the resultant at room temperature for 30 minutes, was mixed with a solution, which was obtained by adding 70.69 g of the $TiO_2$ nanoparticle solution of 5 wt. % (A-1) and 88.83 g of 3-glycidoxypropyltrimethoxysilane (B-3) and stirring the resultant at room temperature for 30 minutes. The resulting mixture was stirred for 12 hours to form a coating liquid (C-3 solution). The element ratio (Ti:Si) was (1:9) and the amount of solid content ($RSiO_{1.5}$ (R represents a vinyl or 3-glycidoxypropyl)+$TiO_2$) was 24.2 wt. %. The average particle diameter of the particles in the solution showed a bimodal distribution in which the peaks were at 1.6 nm and 6.4 nm. It was assumed that 6.4 nm corresponds to $TiO_2$ nanoparticles whereas 1.6 nm corresponds to the particles of a hydrolyzed condensation product of silanes. The preservation stability of this solution was highly favorable and the solution could be used even after 2 months without gelation.

Example 4

1. Synthesis of Photosensitive Compound

The $TiO_2$ nanoparticle solution which was yellow and transparent and had $TiO_2$ concentration of 5 wt. % (A-1) was obtained as in Example 1.

2. Organic Silicon Compound

Vinyltrimethoxysilane (KBM-1003 manufactured by Shin-Etsu Chemical Co., Ltd.) (B-1) and 3-methacryloxypropyltrimethoxysilane (KBM-503 manufactured by Shin-Etsu Chemical Co., Ltd.) (B-4) were used as organic silicon compounds.

3. Preparation of Composition (Coating Liquid) for Forming Organic/Inorganic Composites 327.31 g of the $TiO_2$ nanoparticle solution of 5 wt. % (A-1) was added to 273.20 g of vinyltrimethoxysilane (B-1) and after stirring the resultant at room temperature for 24 hours, the resulting solution was vacuum concentrated using a rotatory evaporator so that the concentration of solid content was 55 to 65 wt. %. 3-Methacryloxypropyltrimethoxysilane (B-4) was added to 100 g of this concentrated solution and the resultant was stirred for 24 hours to form a coating liquid (C-4 solution). The element ratio (Ti:Si) was (1:9) and the amount of solid content ($RSiO_{1.5}$ (R represents a vinyl or 3-methacryloxypropyl)) was 24.2 wt. %. The average particle diameter of the particles in the solution showed a bimodal distribution in which the peaks were at 1.1 nm and 4.4 nm. It was assumed that 4.4 nm corresponds to $TiO_2$ nanoparticles whereas 1.1 nm corresponds to the particles of a hydrolyzed condensation product of silanes. The preservation stability of this solution was highly favorable and the solution could be used even after 2 months without gelation.

Example 5

1. Photosensitive Compound

Zirconium acetyldiacetonate (ZR-181 manufactured by Nippon Soda Co., Ltd. in which the amount of solid content based on zirconium oxide was 15.00 weight %) (A-2) was used.

2. Organic Silicon Compound

Vinyltrimethoxysilane (KBM-1003 manufactured by Shin-Etsu Chemical Co., Ltd.) (B-1) and 3-methacryloxypropyltrimethoxysilane (KBM-503 manufactured by Shin-Etsu Chemical Co., Ltd.) (B-4) were used as organic silicon compounds.

3. Preparation of Composition (Coating Liquid) for Forming Organic/Inorganic Composites 190 g of vinyltrimethoxysilane (B-1) and 212.08 g of 3-methacryloxypropyltrimethoxysilane (B-4) were mixed and the liquid in which 36.29 g of zirconium acetyldiacetonate (A-2) was diluted with 114 g of ethanol was added thereto. While stirring this mixed solution, the liquid in which 76.95 g of ion-exchanged water (twice as much as Si in terms of moles) was diluted with 114 g of ethanol was slowly added dropwise thereto and the resultant was stirred at room temperature for 24 hours to form a coating liquid (C-5 solution). The element ratio (Zr:Si) was (2:98) and the amount of solid content ($RSiO_{1.5}$ (R represents a vinyl or 3-methacryloxypropyl)) was 35.0 wt. %. The average particle diameter of the particles in the solution showed a broad particle-diameter distribution in which a peak was at 3.37 nm. The preservation stability of this solution was highly favorable and the solution could be used even after 2 months without gelation.

Example 6

1. Photosensitive Compound 10.00 g of aluminum trisacetylacetonate (manufactured by Acros Organics) was dissolved in 200 g of ethanol to prepare a colorless and transparent solution (in which the concentration of solid content based on aluminum oxide was 0.78 wt. %) (A-3).

2. Organic Silicon Compound

Vinyltrimethoxysilane (KBM-1003 manufactured by Shin-Etsu Chemical Co., Ltd.) (B-1) and 3-methacrylopropyltrimethoxysilane (KBM-503 manufactured by Shin-Etsu Chemical Co., Ltd.) (B-4) were used as organic silicon compounds.

3. Preparation of Composition (Coating Liquid) for Forming Organic/Inorganic Composites 10.13 g of ion-exchanged water (twice as much as Si in terms of moles) was added to 38.35 g of the aluminum acetylacetonate solution (A-3). 25.0 g of vinyltrimethoxysilane (B-1) and 27.9 g of 3-methacryloxypropyltrimethoxysilane (B-4) were added thereto and the resultant was stirred at room temperature for 24 hours to form a coating liquid (C-6 solution). The element ratio (Al:Si) was (2:98) and the amount of solid content ($RSiO_{1.5}$ (R represents a vinyl or 3-methacryloxypropyl)) was 38.6 wt. %. The average particle diameter of the particles in the solution showed a broad particle-diameter distribution in which a peak was at 1.95 nm. The preservation stability of this solution was highly favorable and the solution could be used even after 2 months without gelation.

[Light Source Lamp]

A. Germicidal lamp (GL-15: UV light having a wavelength of 254 nm as a main component; manufactured by Toshiba Corporation)

B. Black light (FL15BLB: UV light having a wavelength of 365 nm as a main component; manufactured by Toshiba Corporation)

C. Condensing-type high pressure mercury lamp (UV light having wavelengths of 365 nm, 313 nm, and 254 nm as main components; manufactured by Eye Graphics Co., Ltd.; 160 W/cm; single-lamp type; lamp height of 10 cm; conveyor speed of 5 m/min)

EXAMPLES 1-1 to 1-3

4. Formation of Coating Film

The C-1 solution which was a composition for forming coating films was coated on a substrate according to D-1 to D-3 described below using a bar coater and dried at 60° C. for 30 minutes. Subsequently, UV light from the germicidal lamp was irradiated thereon to obtain a transparent thin film (film thickness: 2 μm).

[Substrate]
1. Soda lime glass (SLG) substrate (D-1)
2. Acrylic substrate (D-2)
3. Polycarbonate (PC) substrate (D-3)

Figure 2:
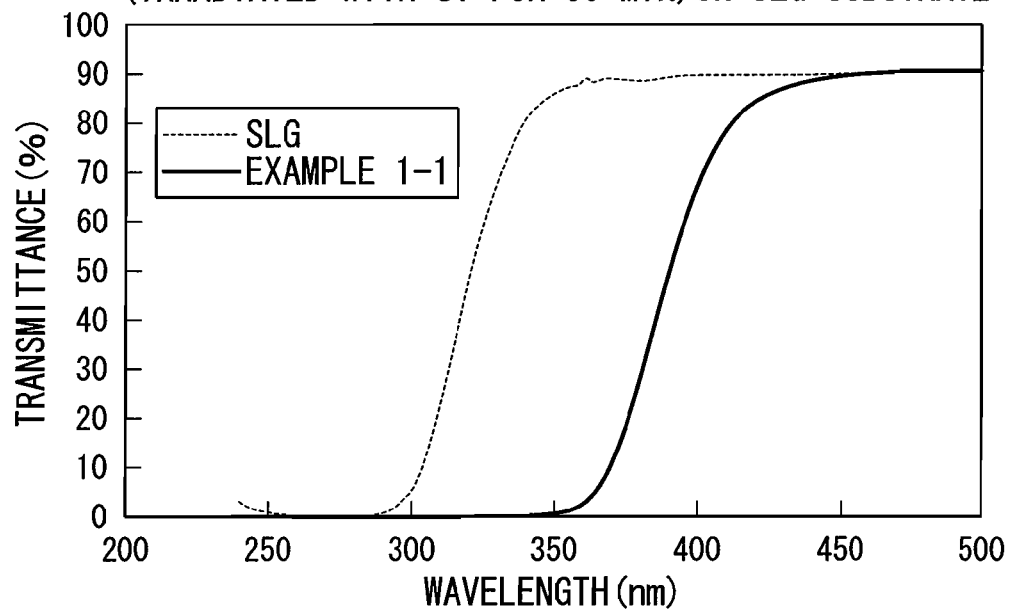
FIG. 2 is a diagram showing the UV-absorption characteristics of an SLG substrate and of the film of Example 1-1 (irradiation of UV light for 30 minutes) on the SLG substrate.

The UV-absorption characteristics of the SLG substrate and film of Example 1-1 (UV irradiation of 30 minutes using the germicidal lamp) on the SLG substrate are shown in FIG. 2.

Example 2-1

4. Formation of Coating Film

The C-2 solution which was a composition for forming coating films was coated on a substrate according to the abovementioned D-1 using a bar coater and dried at 60° C. for 30 minutes. Subsequently, UV light from the germicidal lamp (254 nm; 4 mW/cm$^2$) was irradiated thereon to obtain a transparent thin film (film thickness: 2 μm).

Example 3-1

4. Formation of Coating Film

The C-3 solution which was a composition for forming coating films was coated on a substrate according to the abovementioned D-3 using a bar coater (Rod No. 10) and dried at 60° C. for 30 minutes. Thereafter, UV light from the germicidal lamp was irradiated (8 mW/cm$^2$; 30 minutes) thereon to obtain a hard coat film (film thickness: 4 μm).

Example 4-1

4. Formation of Coating Film

The C-4 solution which was a composition for forming coating films was coated on a substrate according to the abovementioned D-3 using a spinner (rotation frequency of 1000 rpm) and dried at 60° C. for 30 minutes. Thereafter, UV light from the germicidal lamp was irradiated (8 mW/cm$^2$; 30 minutes) thereon to obtain a hard coat film (film thickness: 2 μm).

Example 4-2

4. Formation of Coating Film

The C-4 solution which was a composition for forming coating films was coated on a substrate according to the abovementioned D-3 using a spinner (rotation frequency of 1000 rpm) and dried at 60° C. for 30 minutes. Thereafter, a hard coat film (film thickness: 2 μm) was obtained using a conveyor-type high pressure mercury lamp (manufactured by Eye Graphics Co., Ltd.; 160 W/cm; lamp height of 10 cm; irradiation time of 5 seconds).

Example 5-1

4. Formation of Coating Film

The C-5 solution which was a composition for forming coating films was coated on a substrate according to the abovementioned D-3 by dip coating (60 cm/min) to form a film and dried at 120° C. for 30 minutes. Thereafter, a hard coat film (film thickness: 4 μm) was obtained using a conveyor-type, condensing high-pressure mercury lamp (manufactured by Eye Graphics Co., Ltd.; 160 W/cm; single-lamp type; lamp height of 10 cm; conveyor speed of 5 m/min) and irradiating 6 paths.

Example 6-1

4. Formation of Coating Film

The C-6 solution which was a composition for forming coating films was coated on a substrate according to the abovementioned D-3 by dip coating (60 cm/min) to form a film and dried at 120° C. for 30 minutes. Thereafter, a hard coat film (film thickness: 4 μm) was obtained using a conveyor-type, condensing high-pressure mercury lamp (manufactured by Eye Graphics Co., Ltd.; 160 W/cm; single-lamp type; lamp height of 10 cm; conveyor speed of 5 m/min) and irradiating 6 paths.

[Film Evaluation]

Adhesive properties and hardness of the thin films according to the abovementioned Examples 1-1 (SLG substrate) and 1-2 (acrylic substrate) were evaluated by the film evaluation method shown below. The results are shown in Table 1.

[Film Evaluation Method]

(1) Sellotape (Registered Trademark) Peel Test (Evaluation of Adhesive Properties)

A piece of Sellotape was pasted on each sample and after scrubbing it several times with a finger cushion, evaluation was made as to whether the film on a substrate was detached when the Sellotape was ripped off.

Evaluation ○: Not detached
Evaluation x: Detached (2) Pencil Hardness Test (Hardness Evaluation)

The test was carried out conforming to the pencil method of JIS K 5600-5-4.

TABLE 1

| Bar No. 9 | | Drying (60° C. 30 min) | | Light irradiation (254 nmUV 4 mW/cm² 1 hr) | |
|---|---|---|---|---|---|
| | | Adhesive property | Pencil hardness | Adhesive property | Pencil hardness |
| Example 1-1 (SLG substrate) | Transparent | ○ | 3H | ○ | 9H |
| Example 1-2 (acrylic substrate) | Transparent | ○ | 3H | ○ | 4H |

As is clear from Table 1, all thin films showed excellent results regarding adhesive properties. Moreover, regarding hardness, films exhibiting 3H were obtained in those on both SLG and acrylic substrates and dried at 60° C. As for those irradiated with UV light having a wavelength of 254 nm, hardness further improved and the improvement reached 9H in the film on the SLG substrate.

Next, the results of evaluating the hardness of the thin films according to the abovementioned Examples 1-1 (SLG substrate) and 1-2 (acrylic substrate) while changing the irradiation time of UV light are shown in Table 2. In addition, with regard to the thin film according to Example 1-1 (SLG substrate), the following was evaluated while changing the irradiation time of UV light; i.e. the carbon content in the film surface (10 nm deep from the surface to be precise) when regarding the carbon content in the film back surface (10 nm deep from the back surface to be precise) as 100%, and the thickness of the film surface layer where the carbon content thereof is lower than that of the film back surface. The evaluation results are shown in Table 3.

Figure 4:
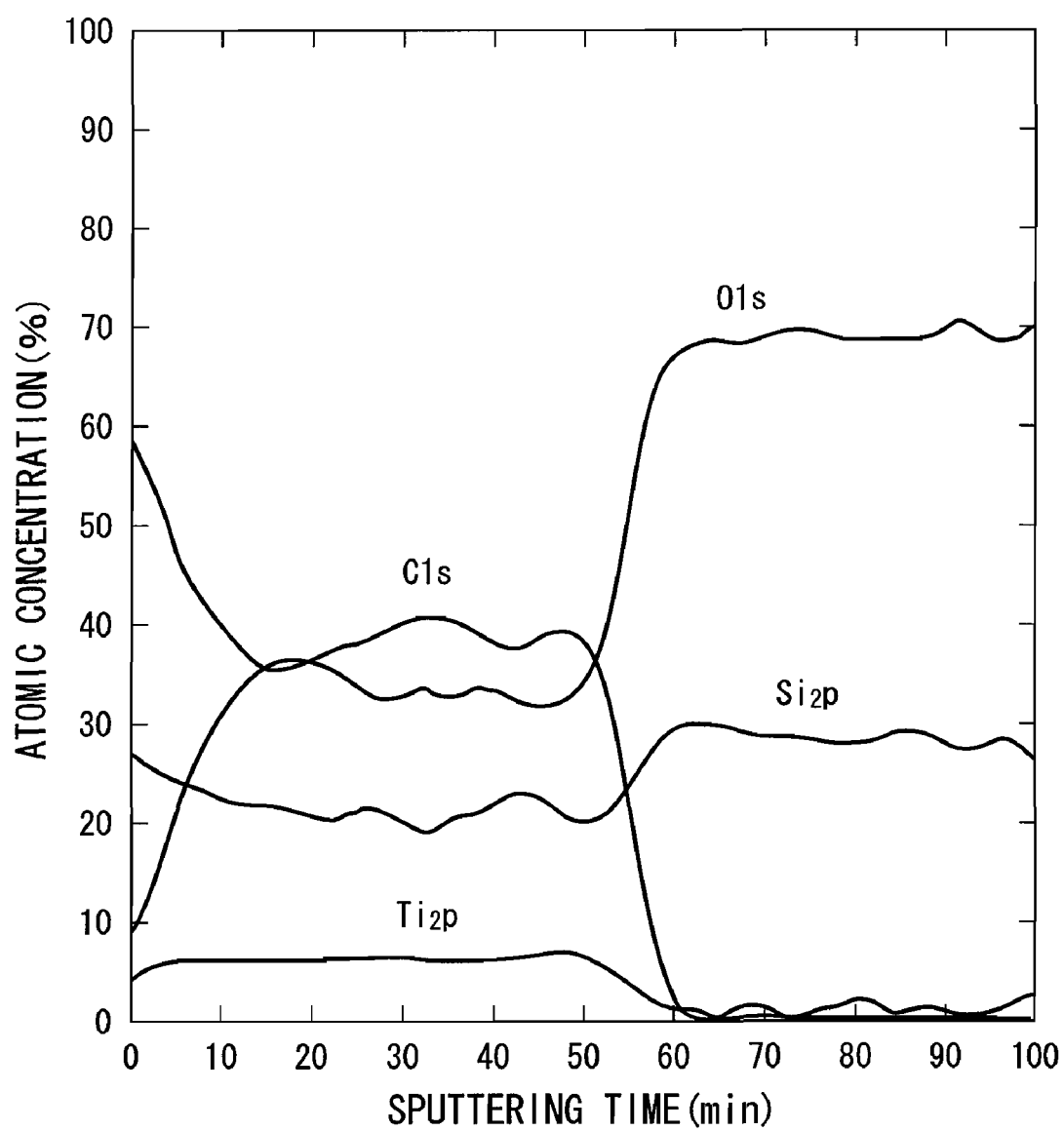
FIG. 4 is a diagram showing film components regarding the thin film according to Example 1-1 (SLG substrate) of the present invention measured by ESCA after being irradiated with UV light.

Moreover, in the thin film (film thickness of 2 μm) according to the abovementioned Example 1-1 (SLG substrate), film components of that irradiated with UV light for 30 minutes were evaluated by ESCA. The results thereof are shown in FIG. 4. As shown in FIG. 4, it is apparent that the amount of carbon in the film surface reduces and the amount of oxygen increases after the UV irradiation. It is considered that vinyl groups are decomposed due to the effect of the photosensitive compound.

TABLE 2

| Light irradiation (254 nmUV 4 mW/cm²) | Before irradiation | 5 min | 10 min | 20 min | 30 min |
|---|---|---|---|---|---|
| Example 1-1 (SLG substrate) | 3H | 4H | 4H | 8H | 9H |
| Example 1-2 (acrylic substrate) | 3H | 3H | 3H | 4H | 4H |

TABLE 3

| Light irradiation (254 nmUV 4 mW/cm²) | Before irradiation | 5 min | 10 min | 20 min | 30 min |
|---|---|---|---|---|---|
| Ratio of carbon contents in film surface and back surface (%) | 100 | 90 | 80 | 52 | 40 |
| Thickness of surface layer having lower carbon content (nm) | 0 | — | — | 300 | 500 |

As is apparent from Table 2, the increase in hardness was observed for those on the SLG substrate even with the irradiation of 5 minutes and a marked increase in hardness was observed with the irradiation of 20 minutes or more. With regard to those on the acrylic substrate, the increase in hardness was observed with the irradiation of about 20 minutes. This increase in hardness due to the UV irradiation was well correlated with the ratio of carbon contents in the film surface and back surface and also with the thickness of the surface layer where the carbon content is low; i.e. the carbon content reached 60% or less and the thickness of the surface layer was 300 nm when irradiated for 20 minutes.

Furthermore, with regard to the thin films according to the abovementioned Examples 1-1 (SLG substrate) and 1-2 (acrylic substrate), the hardness thereof was evaluated when irradiated with UV light having a wavelength of 365 nm (BLB lamp) instead of UV light having a wavelength of 254 nm (germicidal lamp). The results are shown in Table 4.

TABLE 4

| Light irradiation (365 nmUV 2 mW/cm²) | Before irradiation | 10 min | 20 min | 60 min | 120 min | 360 min |
|---|---|---|---|---|---|---|
| Example 1-1 (SLG substrate) | 3H | 4H | 4H | 4H | 4H | 4H |
| Example 1-2 (acrylic substrate) | 3H | 3H | 3H | 3H | 3H | 3H |

As is apparent from Table 4, the increase in hardness was hardly observed. From this observation, it is considered that the films changed due to the sensitivity of the photosensitive compound to UV light having a wavelength of 254 nm resulting in the increase in hardness thereof. Furthermore, since the compound is not sensitive to UV light having a wavelength of 365 nm, the film can be described as being difficult to deteriorate due to sunlight, and thus useful even for outdoor use.

In addition, with regard to the thin films according to the abovementioned Example 1-3 (PC substrate), the adhesive properties and hardness thereof were evaluated by the abovementioned film evaluation method. The results are shown in Table 5.

TABLE 5

|  |  |  | Drying (120° C. 10 min) | | Light irradiation (254 nm UV 4 mW/cm² 1 hr) | |
| --- | --- | --- | --- | --- | --- | --- |
|  |  |  | Adhesive property | Pencil hardness | Adhesive property | Pencil hardness |
| Example 1-3 (PC substrate) | Bar No. 9 | Transparent | ○ | F | ○ | F |
|  | Bar No. 12 | Transparent | ○ | F | ○ | F |
|  | Bar No. 18 | Transparent | ○ | F | ○ | F |
| PC substrate | No coating |  |  | 4B |  |  |

As is apparent from Table 5, all thin films showed excellent adhesive properties. Moreover, it is apparent that hardness increased from 4B to F due to the presence of film coating. Although the change in hardness was not observed after UV irradiation, this is considered due to the substrate being too soft making the film evaluation by the pencil hardness test impossible.

With regard to the thin film according to the abovementioned Example 1-3 (PC substrate) which was difficult to evaluate by the pencil hardness test, reevaluation was made by the following steel wool test. The results are shown in Tables 6 and 7. Table 6 shows changes in haze ratio when the substrate itself was rubbed with steel wool. Table 7 shows changes in haze ratio when the film dried at 120° C. for 10 minutes was rubbed with steel wool and the haze ratio after the film which was irradiated with UV light for a predetermined time was rubbed with steel wool.

[Film Evaluation Method]

Steel Wool Test (Evaluation of Scratch Resistance)

The rubbing with steel wool (SW) #0000 was carried out 10 times and haze was measured before and after the rubbing.

TABLE 6

| PC substrate | Haze ratio (%) | Total light transmittance (%) | Linear transmittance (%) |
| --- | --- | --- | --- |
| [SW before] | 0.12 | 90.7 | 90.59 |
| [SW after] | 21.7 | 90.69 | 71.01 |

TABLE 7

| Film (PC substrate) | Haze ratio (%) | Total light transmittance (%) | Linear transmittance (%) |
| --- | --- | --- | --- |
| [SW before] dried | 0.07 | 91.91 | 91.84 |
| [SW after] dried | 13.09 | 91.05 | 79.14 |
| UV 10 minutes | 8.85 | 90.29 | 82.3 |

TABLE 7-continued

| Film (PC substrate) | Haze ratio (%) | Total light transmittance (%) | Linear transmittance (%) |
| --- | --- | --- | --- |
| UV 20 minutes | 0.55 | 91.1 | 90.6 |
| UV 30 minutes | 0.34 | 90.31 | 90 |
| UV 60 minutes | 0.32 | 90.19 | 89.9 |
| UV 90 minutes | 0.22 | 89.55 | 89.35 |

As shown in Table 6, the haze ratio (Hz) of the PC sheet itself by the SW test was 21%, and thus highly prone to scratches. As shown in Table 7, when the film was coated and dried, the SW test showed the Hz of 13%, and thus the effect was observed. Furthermore, when the irradiation of UV light was carried out, the effect thereof was marked and the Hz of 1% or less was achieved when UV light was irradiated for 20 minutes. Scratches were hardly observed. As described so far, effects were observed even when the PC sheet was used.

Figure 3:
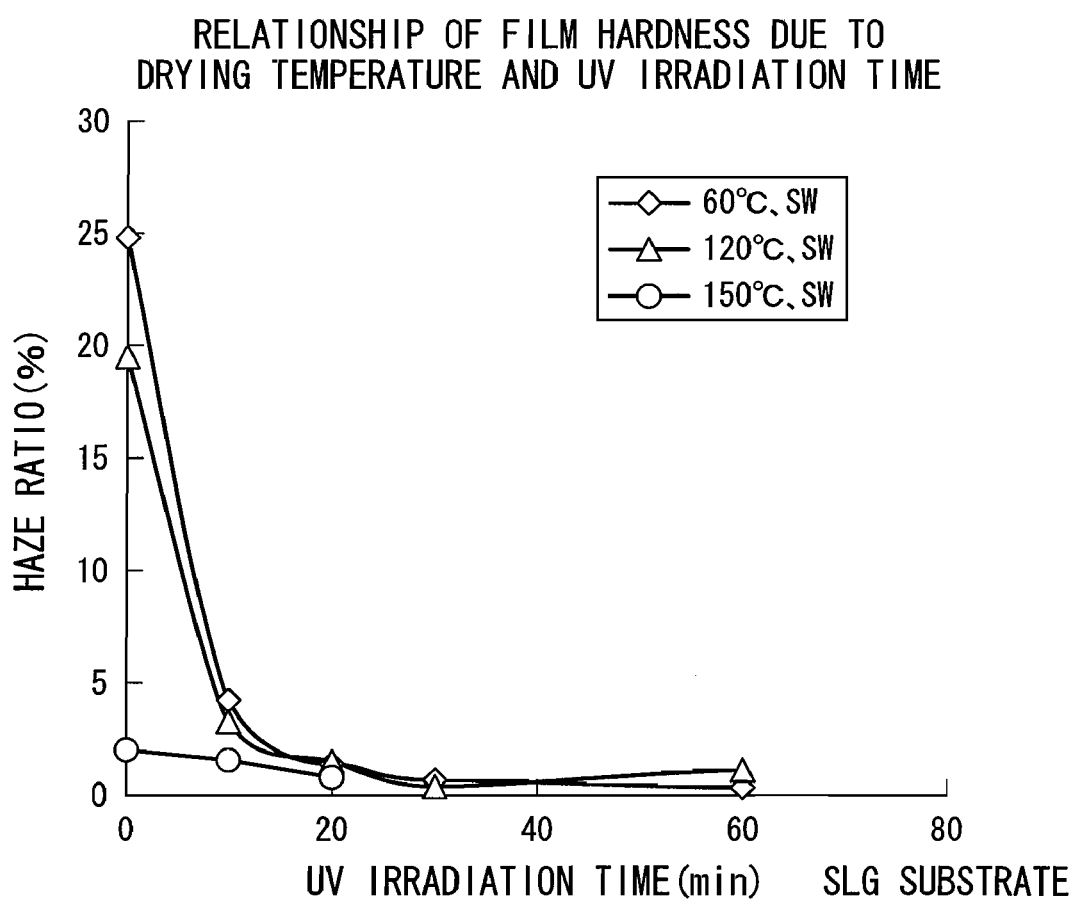
FIG. 3 is a diagram showing changes in haze ratio regarding the thin film according to Example 1-1 (SLG substrate) of the present invention with respect to drying temperature and irradiation time.

Subsequently, with regard to the thin film according to the abovementioned Example 1-1 (SLG substrate), changes in haze ratio with respect to drying temperature (30 minutes) and irradiation time were examined. The results are shown in FIG. 3. As shown in FIG. 3, the film hardened achieving 2% or more by the SW test when dried at 150° C. even without the irradiation of UV light. Abrasion resistance improved even further when this film was irradiated with UV light. In addition, in the cases where drying at 60° C. and 120° C. was carried out, abrasion resistance was even more favorable and adhesive properties were also favorable when the irradiation with UV light was carried out. Not much difference was observed between one dried at 60° C. and one dried at 120° C.

Next, the results of adhesive properties and pencil hardness of the film on the SLG substrate which was examined with regard to the thin film according to Example 2 are shown in Table 8. The pencil hardness of the film dried at 120° C. was 5H whereas that further irradiated with UV light from the germicidal lamp for 30 minutes improved to 7H and that irradiated for 60 minutes improved to 8H.

TABLE 8

|  | Drying at 120° C. | | | Irradiation for 30 min | | Irradiation for 60 min | | Irradiation for 90 min | |
| --- | --- | --- | --- | --- | --- | --- | --- | --- | --- |
| Substrate | Appearance | Adhesive property | Pencil hardness | Adhesive property | Pencil hardness | Adhesive property | Pencil hardness | Adhesive property | Pencil hardness |
| SLG substrate | Transparent | ◇ | 5H | ◇ | 7H | ◇ | 8H | ◇ | 8H |

Next, film evaluation was carried out by the following film evaluation method regarding the thin films according to the abovementioned Examples 3-1, 4-1, and 4-2. The results are shown in Table 9.

[Film Evaluation Method]

(1) Tape Peel Test (Evaluation of Adhesive Properties)

In conformity with JIS K 5600, 11 cuttings each in vertical and horizontal directions with 1-mm intervals were made in a coating film to produce 100 grids. A piece of Sellotape (registered trademark) was pasted on each sample and after rubbing it several times with a finger cushion for adhesion, the tape was ripped off and evaluation was made by the number of grids where the coating film remained without being detached.

(2) Steel Wool Test (Evaluation of Abrasion Resistance)

Steel wool (#0000) was attached onto a rubbing tester (Rubbing Tester manufactured by Taihei Rika Kogyo Co., Ltd.) and the haze ratio was measured after the steel wool reciprocated 30 times under the condition with a load of 500 g.

(3) Taber Abrasion Test

An abrasion wheel (C-10F) was mounted on a Taber abrader (Taber' Abrasion Tester manufactured by Toyo Tester Kogyo Co., Ltd.) and the haze ratio was measured after the test of 500 revolutions was carried out under the condition with a load of 500 g.

(4) Measurement of Surface Resistance

The measurement was made using a surface resistance measuring instrument (Hiresta-UP MCP-HT4500 manufactured by Mitsubishi Chemical Corporation) at an applied voltage of 1000 V and measuring time of 10 seconds.

TABLE 9

| Test method | Tape peel test | Steel wool test (haze ratio %) | Taber abrasion test (haze ratio %) | Surface resistance ($\Omega/\square$) | Ratio of carbon contents in film surface and back surface (%) | Thickness of surface layer having lower carbon content (nm) |
| --- | --- | --- | --- | --- | --- | --- |
| Example 3-1 | 100/100 | 1 to 3 | 4 to 8 | 1.5 to $8.8 \times 10^{10}$ | 33% | 800 nm |
| Example 4-1 | 100/100 | 0.5 to 1 | 6 to 15 | 1.2 to $5.8 \times 10^{11}$ | 45% | 500 nm |
| Example 4-2 | 100/100 | 0.5 to 1 | 4 to 12 | 1.5 to $7.2 \times 10^{11}$ | 50% | 400 nm |

As shown in Table 9, the thin films according to Examples 3-1, 4-1, and 4-2 of the present invention showed the following properties and effects which are those of a hard coat film; i.e. excellent adhesive properties with the PC sheet; high abrasion resistant properties showing the haze ratio (Hz) of 3% or less with the steel wool test and 15% or less with the Taber abrasion test; and low surface resistance value which was $10^{11}$ or less.

Figure 5:
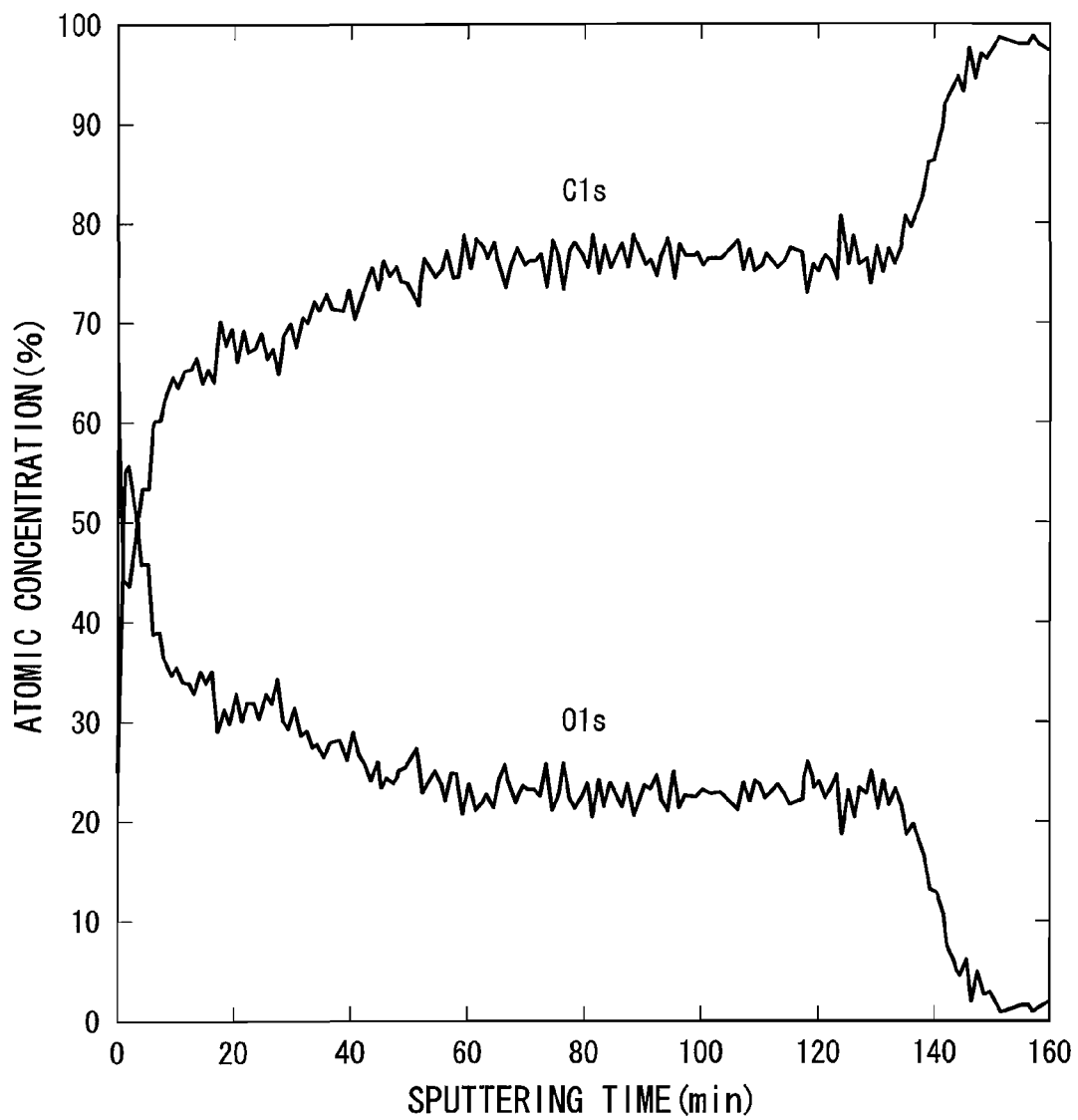
FIG. 5 is a diagram showing film components regarding the thin film according to Example 5-1 (PC substrate) of the present invention measured by ESCA after being irradiated with UV light.
Figure 6:
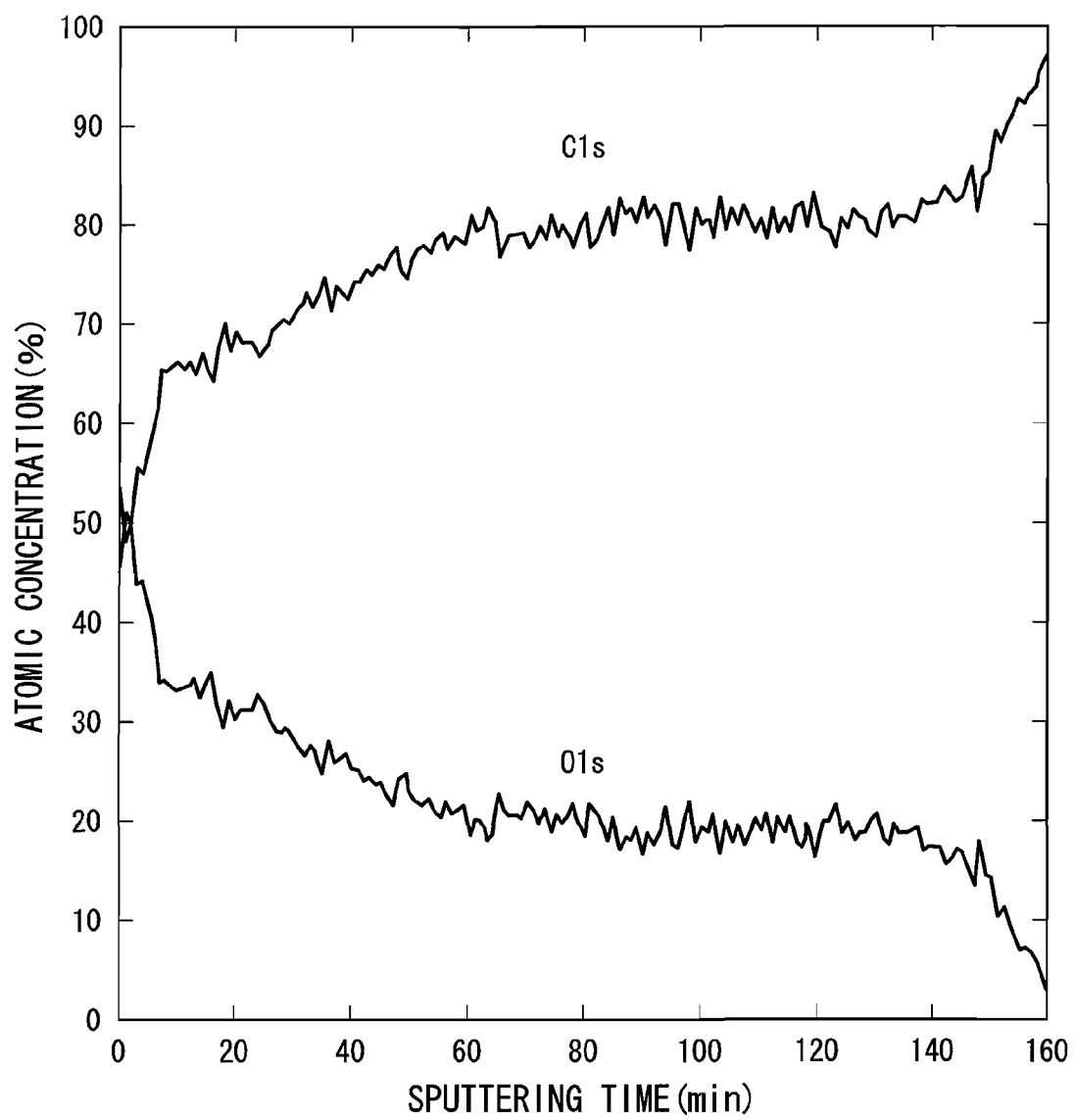
FIG. 6 is a diagram showing film components regarding the thin film according to Example 6-1 (PC substrate) of the present invention measured by ESCA after being irradiated with UV light.

Next, the film components regarding the thin films according to the abovementioned Examples 5-1 and 6-1 were evaluated by ESCA. The results are shown in FIGS. 5 and 6. As shown in FIGS. 5 and 6, it is apparent that the amount of carbon in the film surface reduces and the amount of oxygen increases after the irradiation of UV light.

Then the film evaluation regarding the thin films according to the abovementioned Examples 5-1 and 6-1 was carried out. The results are shown in Table 10.

TABLE 10

| Test method | Tape peel test | Steel wool test (haze ratio %) | Taber abrasion test (haze ratio %) | Surface resistance ($\Omega/\square$) | Ratio of carbon contents in film surface and back surface (%) | Thickness of surface layer having lower carbon content (nm) |
| --- | --- | --- | --- | --- | --- | --- |
| Example 5-1 | 100/100 | 0.5 to 1 | 5 to 8 | $2.0 \times 10^{13}$ | 56% | 200 nm |
| Example 6-1 | 100/100 | 1 to 2 | 5 to 8 | $2.5 \times 10^{13}$ | 52% | 200 nm |

As shown in Table 10, it was confirmed that the thin films according to Examples 5-1 and 6-1 of the present invention were hard coat films having excellent adhesive properties with the PC sheet and which exhibited high abrasion resistant properties showing the haze ratio (Hz) of 2% or less with the steel wool test and 8% or less with the Taber abrasion test.

The invention claimed is:

1. An organic/inorganic composite comprising:
    a condensation product of an organic silicon compound represented by formula (I) as a major component; and
    at least one kind of a photosensitive compound that is sensitive to light having a wavelength of 250 nm to 310 nm selected from the group consisting of metal chelate compounds, compounds of metal organic acid salts, metal compounds having 2 or more hydroxyl or hydrolyzable groups, hydrolyzates thereof, and condensation products thereof; and/or a compound derived from the photosensitive compound;

$$R_n SiX_{4-n} \qquad (I)$$

wherein:
    R represents an organic group having a carbon directly bonded to Si represented in the formula;
    X represents a hydroxyl or a hydrolyzable group;

n represents 1 or 2;

R may be the same or different when n is 2; and

X may be the same or different when (4-n) is 2 or more.

2. The organic/inorganic composite according to claim 1, wherein the metal chelate compound has a hydroxyl or a hydrolyzable group.

3. The organic/inorganic composite according to claim 1, wherein the compound of a metal organic acid salt has a hydroxyl or a hydrolyzable group.

4. The organic/inorganic composite according to claim 1, wherein the hydrolyzate and/or the condensation product of a metal compound, which has 2 or more hydroxyl or hydrolyzable groups, is a hydrolyzed product using 0.5 moles or more of water with respect to 1 mole of the metal compound having 2 or more hydroxyl or hydrolyzable groups.

5. The organic/inorganic composite according to claim 1, wherein the hydrolyzate and/or the condensation product of a metal chelate compound is a hydrolyzed product using 5 to 100 moles of water with respect to 1 mole of the metal chelate compound.

6. The organic/inorganic composite according to claim 1, wherein the hydrolyzate and/or the condensation product of a compound of a metal organic acid salt is a hydrolyzed product using 5 to 100 moles of water with respect to 1 mole of the compound of a metal organic acid salt.

7. A polysiloxane-based thin film, comprising:

a condensation product of an organic silicon compound represented by formula (I) as a major component:

$$R_nSiX_{4-n} \quad (I)$$

where:

R represents an organic group having a carbon directly bonded to Si represented in the formula;

X represents a hydroxyl or hydrolyzable group;

n represents 1 or 2;

R may be the same or different when n is 2; and

X may be the same or different when (4-n) is 2 or more; and a photosensitive compound that is sensitive to light having a wavelength of 250 nm to 310 nm; and/or a compound derived from the photosensitive compound;

wherein a carbon content in a film surface section at 10 nm from the film surface in a depth direction is 80% or less of a carbon content in a film back-surface section at 10 nm from the film back-surface in the depth direction.

8. The polysiloxane-based thin film according to claim 7, wherein said photosensitive compound and/or a compound derived from the photosensitive compound is selected from the group consisting of metal chelate compounds, compounds of metal organic acid salts, metal compounds having 2 or more hydroxyl or hydrolyzable groups, hydrolyzates thereof, and condensation products thereof.

9. A production method of an organic/inorganic composite, the method comprising:

irradiating light having a wavelength of 250 nm to 310 nm onto an organic silicon compound represented by formula (I) and/or a condensation product thereof under the presence of at least one kind of a photosensitive compound that is sensitive to light having a wavelength of 250 nm to 310 nm selected from the group consisting of metal chelate compounds, compounds of metal organic acid salts, metal compounds having 2 or more hydroxyl or hydrolyzable groups, hydrolyzates thereof, and condensation products thereof;

$$R_nSiX_{4-n} \quad (I)$$

wherein:

R represents an organic group having a carbon directly bonded to Si represented in the formula;

X represents a hydroxyl or hydrolyzable group;

n represents 1 or 2;

R may be the same or different when n is 2; and

X may be the same or different when (4-n) is 2 or more.

10. A composition for forming an organic/inorganic composite, the composition comprising:

an organic silicon compound represented by formula (I) and/or a condensation product thereof; and at least one kind of a photosensitive compound that is sensitive to light having a wavelength of 250 nm to 310 nm selected from the group consisting of metal chelate compounds, compounds of metal organic acid salts, metal compounds having 2 or more hydroxyl or hydrolyzable groups, hydrolyzates thereof, and condensation products thereof;

$$R_nSiX_{4-n} \quad (I)$$

wherein:

R represents an organic group having a carbon directly bonded to Si represented in the formula;

X represents a hydroxyl or hydrolyzable group;

n represents 1 or 2;

R may be the same or different when n is 2; and

X may be the same or different when (4-n) is 2 or more.

* * * * *